United States Patent
Bertram

(10) Patent No.: US 9,556,946 B2
(45) Date of Patent: Jan. 31, 2017

(54) VEHICLE TRANSMISSION GEAR ASSEMBLY

(71) Applicant: FORD GLOBAL TECHNOLOGIES, LLC, Dearborn, MI (US)

(72) Inventor: Ulrich Bertram, Bergheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 825 days.

(21) Appl. No.: 13/856,192

(22) Filed: Apr. 3, 2013

(65) Prior Publication Data

US 2014/0130629 A1 May 15, 2014

(30) Foreign Application Priority Data

Apr. 4, 2012 (DE) .................. 10 2012 205 551

(51) Int. Cl.
*F16H 55/18* (2006.01)

(52) U.S. Cl.
CPC .......... *F16H 55/18* (2013.01); *Y10T 74/19898* (2015.01)

(58) Field of Classification Search
CPC .... F16H 55/18; F16H 2055/185; F16H 57/12; F16H 2057/127
USPC .................................................. 74/409, 440
See application file for complete search history.

(56) References Cited

U.S. PATENT DOCUMENTS

| | | | | |
|---|---|---|---|---|
| 782,628 | A * | 2/1905 | Taylor | B61C 11/04 295/4 |
| 2,737,033 | A * | 3/1956 | Bendall | F16D 3/52 403/220 |
| 2,899,038 | A * | 8/1959 | Wellauer | F16D 3/52 192/109 R |
| 3,877,671 | A | 4/1975 | Underwood et al. | |
| 8,904,894 | B2 * | 12/2014 | Geiser | F16H 55/16 368/38 |
| 2010/0326223 | A1 * | 12/2010 | Lang | F16H 55/14 74/409 |

FOREIGN PATENT DOCUMENTS

| | | | |
|---|---|---|---|
| DE | 846192 | * | 8/1952 |
| DE | 42 25 374 | * | 12/2002 |
| DE | 102007042762 A1 | | 4/2009 |
| DE | 102009001403 B3 | | 8/2010 |
| EP | 0881411 A2 | | 12/1998 |

\* cited by examiner

*Primary Examiner* — William C Joyce
(74) *Attorney, Agent, or Firm* — James Dottavio; MacMillian, Sobanski & Todd, LLC

(57) ABSTRACT

A transmission gear assembly, including: at least two gearwheels fitted with teeth on their periphery and connected together. One of the at least two gearwheels is a main gearwheel. Another of the at least two gearwheels is an auxiliary gearwheel. The teeth of the auxiliary gearwheel are formed resilient in a radial direction.

8 Claims, 2 Drawing Sheets

VEHICLE TRANSMISSION GEAR ASSEMBLY

CROSS-REFERENCE TO RELATED APPLICATIONS

This application is a continuation and claims the benefit of German Patent Application No. DE 102012205551.7 titled "Transmission Gear" filed Apr. 4, 2012, which is hereby incorporated by reference in its entirety.

TECHNICAL FIELD

The present disclosure relates to vehicle transmission gearing.

BACKGROUND

In some modern vehicle transmissions, transmission gears can produce a clattering noise due to the play of intermeshing gearwheels during operating conditions with low load. Clattering can be caused by vibration of the gearwheel. Clattering can occur, above all, in loose wheel pairs without torque loading. Due to excitation, the driving gear flank accelerates the driven flank. A "tooth rattle vibration" builds up that is continuously resupplied with energy.

Therefore, it is desirable to have improved vehicle transmission gearing assemblies with reduced tooth rattle vibrations and noise.

SUMMARY

The present disclosure addresses one or more of the above-mentioned issues. Other features and/or advantages will become apparent from the description which follows.

One of the advantages of the present disclosure is that it provides a transmission gear that causes reduced friction and clattering. The gearing assemblies further require less packaging space.

One exemplary embodiment relates to a transmission gear assembly that includes: at least two gearwheels fitted with teeth on their periphery and connected together. One of the at least two gearwheels is a main gearwheel. Another of the at least two gearwheels is an auxiliary gearwheel. The teeth of the auxiliary gearwheel are formed resilient in a radial direction.

One exemplary embodiment relates to a vehicle transmission gear assembly, having: a first gear; and a second gear concentrically positioned with respect to the first gear. The second gear is spring-mounted with respect to an axis so as to decrease tooth flank play during gear engagement.

The invention will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

DETAILED DESCRIPTION

Turning now to the figures, where like characters represent the same parts, there is shown therein various vehicle transmission gear assemblies.

Figure 2:
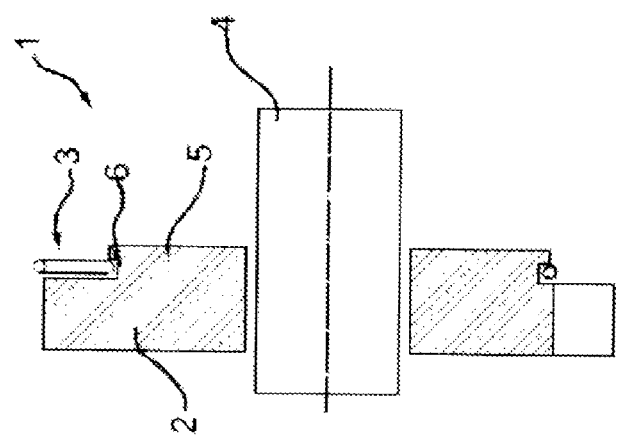
FIG. 2 is a cross-sectional view through the transmission gear assembly of FIG. 1 along line A-A.
Figure 1:
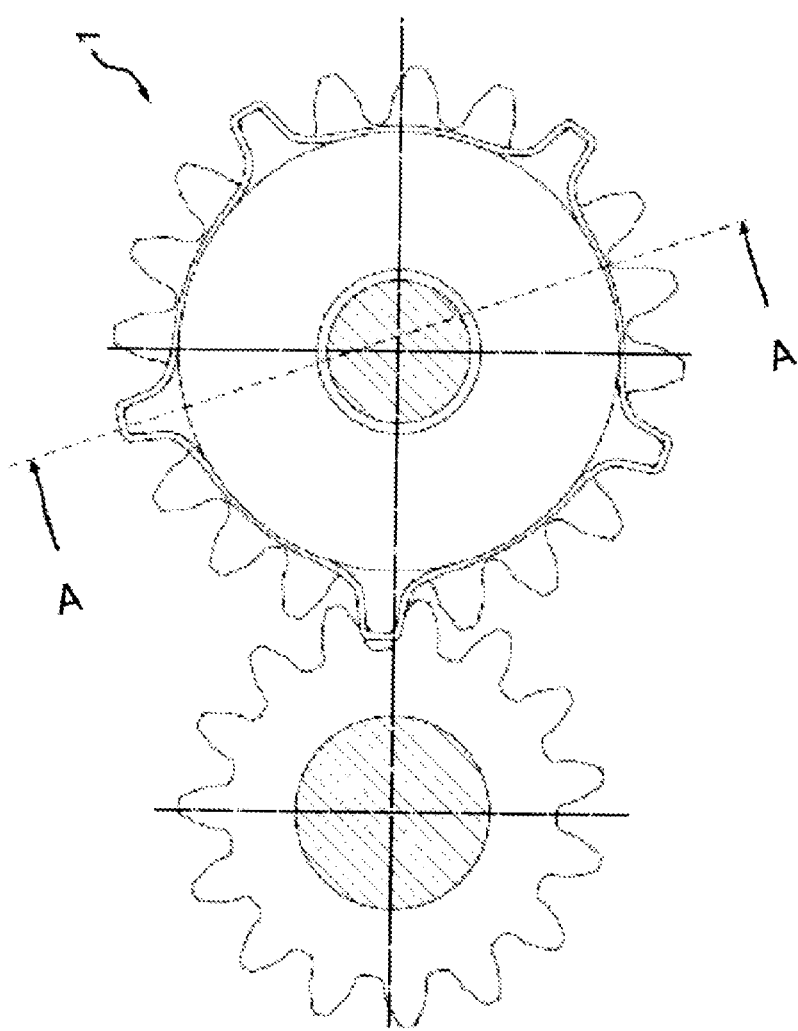
FIG. 1 is a top view of a transmission gear assembly according to an exemplary embodiment of the present disclosure.

FIGS. 1 and 2 show a transmission gear assembly 1. This embodiment includes a main gearwheel assembly 2 that serves for the actual transmission of force and movement and an auxiliary gearwheel 3 that reduces clatter, both of which are arranged on an axis 4. A main gearwheel 2 substantially corresponds to a conventional transmission gear. By distinction it comprises a cylindrical region 5 protruding in the axial direction of the axis 4 and forming a peripheral groove 6 that is inserted in the auxiliary gearwheel 3 formed as a spring wire ring. It forms a quasi-auxiliary gearwheel with a reduced tooth number.

The auxiliary gearwheel 3 has a lower number of teeth than the main gearwheel 2. Teeth on gearwheel 3 imitate the teeth of the main gearwheel 2 and protrude over the teeth of the main gearwheel in a radial direction, or along the radius of the gearwheel. Teeth are resilient in the radial direction and upon intermeshing with another gearwheel yield in the radial direction thereby compensating for any existing play.

Figure 3:
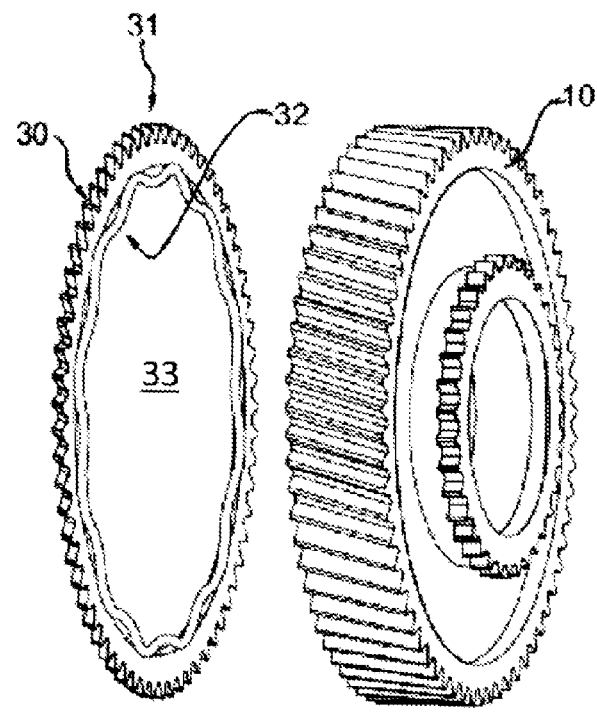
FIG. 3 is a perspective, exploded view of another transmission gear assembly according to an exemplary embodiment of the present disclosure.
Figure 5:
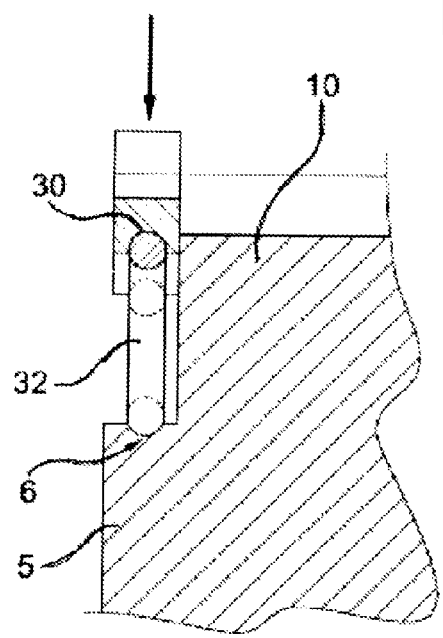
FIG. 5 is a top cross-sectional view of the gear assembly of FIG. 4.
Figure 4:
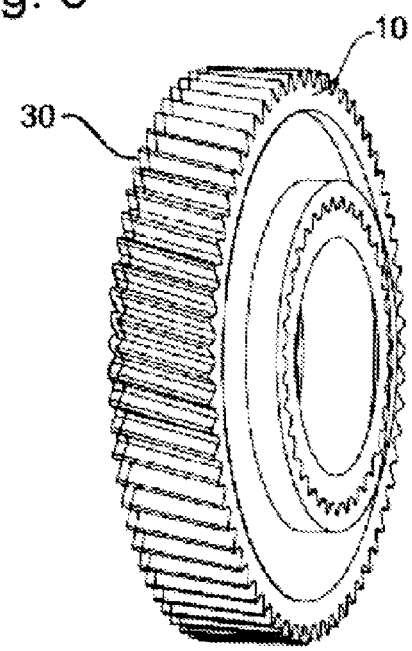
FIG. 4 is a perspective assembly view of the transmission gear assembly of FIG. 3.

Alternatively, the auxiliary gearwheel 30 of FIGS. 3 to 5 include a second complete toothed ring 31 that is mounted radially yielding via a spring ring 32 on an axis or on the main gearwheel 10. The auxiliary gearwheel 30 has a central opening or orifice 33 in which the spring ring 32 abuts the inside with polygonal form. The auxiliary gearwheel 30 or the gearwheel toothed ring is spring-mounted in relation to the transmission gear assembly.

One benefit of the present disclosure is that if the teeth of the auxiliary gear are spring biased in the radial direction, the component requires very little space and does not require great accuracy since it has sufficient space for deviation due to its radial springing.

In one embodiment it is proposed that the auxiliary gearwheel has a lower number of teeth than the main gearwheel. By restricting the gearwheel tooth number to a few teeth, the friction is reduced but nonetheless regular clattering is prevented.

In a preferred embodiment the auxiliary gearwheel includes a spring ring that is resilient in the radial direction. Material should be wear-resistant and sprung, e.g. annealing steel or spring wire. Composite constructions are conceivable to optimize both properties. The radial springing of the sprung wire teeth produces an additional friction connection to the loose gearwheel that prevents the loose gearwheel from oscillating within a tooth gap.

Alternatively the auxiliary gearwheel has a second complete toothed ring that is mounted radially yielding the spring ring. Auxiliary gearwheel has a central opening in which the spring ring abuts the ring in a polygonal form. Thus the auxiliary gearwheel or the gearwheel toothed crown is spring mounted in relation to the axis of the transmission gear.

Those familiar with the art to which the invention relates will recognize various alternative designs and embodiments for practicing the invention within the scope of the appended claims.

I claim:

1. A gear assembly, comprising:
a gearwheel having radially external teeth and a peripheral recess about a circumference;
a spring wire ring having support portions supportably contacting the groove, and antirattle portions matching a profile of and extending radially outward farther than the teeth and being radially resilient, the ring having fewer antirattle portions than the gearwheel has teeth; and
a second gearwheel having radially external second teeth that contact the antirattle portions and the teeth.

2. The gear assembly of claim 1, wherein the second teeth compress the antirattle portions radially upon contact.

3. The gear assembly of claim 1, wherein the second teeth do not contact the support portions.

4. The gear assembly of claim 1, wherein the recess has a lip for axially retaining the first portions in the recess.

5. A gear assembly, comprising:
a first gear having radially external teeth and a peripheral recess about a circumference; and a spring wire ring having support portions supportably contacting the groove, and antirattle portions matching a profile of and extending radially outward farther than the teeth and being radially resilient, the ring having fewer antirattle portions than the first gear has teeth; and
a second gear having radially external second teeth that contact the antirattle portions and the teeth.

6. The gear assembly of claim 5, wherein the second teeth compress the antirattle portions radially upon contact.

7. The gear assembly of claim 5, wherein the second teeth do not contact the support portions.

8. The gear assembly of claim 5, wherein the recess has a lip for axially retaining the first portions in the recess.

\* \* \* \* \*